(12) United States Patent
Goto et al.

(10) Patent No.: US 8,457,550 B2
(45) Date of Patent: Jun. 4, 2013

(54) WIRELESS COMMUNICATION DEVICE AND POWER RECEIVING DEVICE

(75) Inventors: Tetsuro Goto, Kanagawa (JP); Shinichi Fukuda, Kanagawa (JP); Asahiko Nogami, Tokyo (JP)

(73) Assignee: Sony Corporation, Tokyo (JP)

(*) Notice: Subject to any disclaimer, the term of this patent is extended or adjusted under 35 U.S.C. 154(b) by 656 days.

(21) Appl. No.: 12/543,930

(22) Filed: Aug. 19, 2009

(65) Prior Publication Data

US 2010/0210207 A1   Aug. 19, 2010

(30) Foreign Application Priority Data

Aug. 19, 2008   (JP) ................ P2008-210514

(51) Int. Cl.
  *H04B 5/00*   (2006.01)
(52) U.S. Cl.
  USPC .................................. 455/41.1
(58) Field of Classification Search
  USPC .................................. 455/41.2
  See application file for complete search history.

(56) References Cited

U.S. PATENT DOCUMENTS

| | | | | |
|---|---|---|---|---|
| 6,427,065 | B1* | 7/2002 | Suga et al. | 455/41.1 |
| 7,180,421 | B2* | 2/2007 | Pahlaven et al. | 340/572.1 |
| 7,212,789 | B2* | 5/2007 | Kuffner | 455/83 |
| 2006/0141976 | A1* | 6/2006 | Rohde et al. | 455/326 |
| 2006/0145660 | A1* | 7/2006 | Black et al. | 320/108 |
| 2008/0084271 | A1* | 4/2008 | Jaeger et al. | 340/5.1 |
| 2009/0111531 | A1* | 4/2009 | Cui et al. | 455/572 |
| 2010/0068998 | A1* | 3/2010 | Zyambo et al. | 455/41.1 |

FOREIGN PATENT DOCUMENTS

| | | |
|---|---|---|
| GB | 2421663 | 6/2006 |
| JP | 07-131376 | 5/1995 |
| JP | 2002-109495 | 4/2002 |
| JP | 2005-173862 | 6/2005 |
| JP | 2005-323264 | 11/2005 |
| JP | 2005-333169 | 12/2005 |
| JP | 2005333169 | 12/2005 |
| JP | 2006-211551 | 8/2006 |
| JP | 2006211551 | 8/2006 |
| JP | 2007-213117 | 8/2007 |
| JP | 2007213117 | 8/2007 |
| JP | 2008-521287 | 6/2008 |
| WO | 2006055431 A2 | 5/2006 |

OTHER PUBLICATIONS

Partial European Search Report dated Sep. 23, 2010 corresponding to European Patent Appln. No. 09167699.
EP Search Report corresponding to 09167699.9 dated May 25, 2011; 5 pages.
Japanese Office Action for corresponding JP2008-210514 issued on Jun. 22, 2010.

* cited by examiner

*Primary Examiner* — Andrew Wendell
*Assistant Examiner* — David Bilodeau
(74) *Attorney, Agent, or Firm* — K&L Gates LLP

(57) ABSTRACT

A wireless communication device is provided and includes: a first communication processing unit performing communication in an electromagnetic induction system by using a first antenna unit; a second communication processing unit performing communication at higher speed than the first communication processing unit by a system or a communication frequency different from the electromagnetic induction system by using a second antenna unit; and a power generation unit generating power at least for performing communication operations from a carrier signal received by the first antenna unit. The power is generated in the power generation unit by switching a frequency resonance characteristic of the first antenna unit.

10 Claims, 12 Drawing Sheets

WIRELESS COMMUNICATION DEVICE AND POWER RECEIVING DEVICE

CROSS REFERENCES TO RELATED APPLICATIONS

The present application claims priority to Japanese Priority Patent Application JP 2008-210514 filed in the Japan Patent Office on Aug. 19, 2008, the entire contents of which is hereby incorporated by reference.

BACKGROUND

The present disclosure relates to a wireless communication device and a power receiving device. Particularly, the disclosure relates to the wireless communication device and the power receiving device capable of performing communication and the like while obtaining sufficient power even when communication is performed in a state in which antennas of transmission-side and receiving-side wireless communication devices make contact with each other closely.

In related arts, an NFCIP-1 (Near Field Communication Interface and Protocol-1) standard is provided as an international standard of near-field wireless communication. A reader/writer and an IC card complying with the NFCIP-1 standard are broadly used for individual authentication, electronic money payment and the like.

In data communication using a type complying with the NFCIP-1 standard (hereinafter, referred to as an "NFCIP-1 type"), a passive communication mode and an active communication mode by 13.56 MHz electromagnetic induction coupling are prescribed. In the passive communication mode, a non-modulated carrier signal is transmitted from the reader/writer to the IC card. The IC card modulates the transmitted non-modulated carrier signal in accordance with data to be transmitted. The reader/writer obtains data transmitted from the IC card by performing demodulation and the like of the modulated carrier signal. Accordingly, in the passive communication mode, communication is performed without generation of the carrier signal by the IC card itself. Also in the passive communication mode, power generation is performed by using the carrier signal transmitted from the reader/writer and operations of the IC card are performed by using the generated power.

On the other hand, in the active communication mode, the IC card itself generates the carrier signal, modulates the generated carrier signal in accordance with data to be transmitted, then, transmits the signal. The reader/writer performs demodulation and the like of the modulated carrier signal, thereby obtaining data transmitted from the IC card. Accordingly, in the active communication mode, for example, as in JP-A-2005-323264 (Patent Document 1), processing of generating the carrier signal, modulating the generated carrier signal in accordance with data to be transmitted and transmitting the modulated carrier signal is performed by providing a power supply unit using a primary battery or a secondary battery in the IC card and supplying power to respective units of the IC card from the power supply unit.

In the case of the passive communication mode, it is assumed that main applications of the IC card used for the near-field wireless communication are individual authentication (for example, at an entrance gate), electronic money payment (for example, at a vending machine" and the like, therefore, the IC card is designed so that communication stability can be obtained maximally when the IC card is carried by a human hand, for example, when the reader/writer and the IC card is several centimeters apart from each other. Accordingly, it is difficult to obtain stable power in conditions different from the case in which the card is operated by a human hand. For example, when communication of video contents or audio contents is performed by using the reader/writer and the IC card, the IC card is placed on the reader/writer in a state of touching the reader/writer, therefore, it is difficult to obtain stable power.

Additionally, it is necessary to provide the power supply unit using the primary battery or the secondary battery in the active communication mode, therefore, when the remaining amount of the battery is reduced, battery change or charging by connecting the IC card to a charger is necessary.

Thus, it is desirable to provide a wireless communication device and a power receiving device capable of performing communication and the like while obtaining sufficient power even when antennas of transmission-side and receiving-side wireless communication devices are in a close contact state.

SUMMARY

According to an embodiment, there is provided a wireless communication device including a first communication processing unit performing communication in an electromagnetic induction system by using a first antenna unit, a second communication processing unit performing communication at higher speed than the first communication processing unit by a system or a communication frequency different from the electromagnetic induction system by using a second antenna unit, and a power generation unit generating power at least for performing communication operations from a carrier signal received by the first antenna unit, in which the power is generated in the power generation unit by switching a frequency resonance characteristic of the first antenna unit.

In the embodiment, communication in the electromagnetic induction system, for example, an NFCIP-1 type communication is performed in the first communication processing unit by using the first antenna unit. Also, communication higher than the first communication processing unit is performed in the second communication processing unit in a system different from the electromagnetic induction system, for example, a back scatter system by using the second antenna unit. Furthermore, power at least for performing communication operations is generated in the power generation unit from the carrier signal received in the first antenna unit. The first antenna unit is used in close contact state with the transmission-source antenna unit which transmits the carrier signal. The first communication processing unit allows the frequency resonance characteristic of the first antenna unit, for example, a quality factor in an antenna resonant circuit to be high when data communication is performed as well as allows the quality factor to be lower than the time of performing data communication when data communication is not performed, accordingly, power is generated in the power generation unit. Additionally, a content playback unit performing playback of contents is provided, in which the power generation unit supplies generated power to the content playback unit. Furthermore, a power supply unit which can be charged is provided, in which the power generation unit charges the power supply unit by using generated power to supply power at least for performing communication operations from the power supply unit.

According to another embodiment, there is provided a power receiving device including a power generation unit generating power from a carrier signal received by an antenna unit for performing data communication in an electromagnetic induction system, in which power is generated in the power generation unit by switching a frequency resonance characteristic of the antenna unit in accordance with data communication operation in the electromagnetic induction system.

According to the embodiment, power is generated in the power generation unit from the carrier signal received by the antenna unit for performing communication in the electromagnetic induction system, for example, the NFCIP-1 type communication. When data communication is performed in the electromagnetic induction system, the frequency resonance characteristic in the antenna portion, for example, the quality factor in the antenna resonant circuit is allowed to be high. When data communication is not performed, the quality factor is allowed to be lower than the time of performing data communication. The antenna unit is used in a close contact with the transmission-source antenna unit which transmits the carrier signal.

According to the embodiments, power is generated in the power generation unit which generates power from the carrier signal received by the antenna unit for performing data communication in the electromagnetic induction system by switching the frequency resonance characteristic of the antenna unit. Accordingly, it is possible to perform near-field wireless communication and the like while obtaining sufficient power even when antennas of transmission-side and receiving-side wireless communication devices are in the close contact state.

Additional features and advantages are described herein, and will be apparent from the following Detailed Description and the figures.

DETAILED DESCRIPTION

A wireless communication system using a wireless communication device according to an embodiment includes, for example, an initiator and a target complying with near-field wireless communication, in which a first antenna unit used for data communication of related art near-field wireless communication, for example, an NFCIP-1 type and a second antenna unit for performing communication at higher speed than near-field wireless communication using the first antenna unit are provided to thereby improving communication speed in the whole system. Further, power is generated from a carrier signal received by the first antenna unit, thereby performing high-speed communication and processing of communication data, charging of a battery and the like by the generated power. Hereinafter, the best mode for carrying out the invention (hereinafter, embodiments) will be explained. The explanation will be made in the following order.

1. First Embodiment
2. Second Embodiment (a case of performing playback of contents by using generated power)
3. Third Embodiment (a case of performing charging by using generated power)

First Embodiment

[Configuration of a Wireless Communication System]

Figure 1:
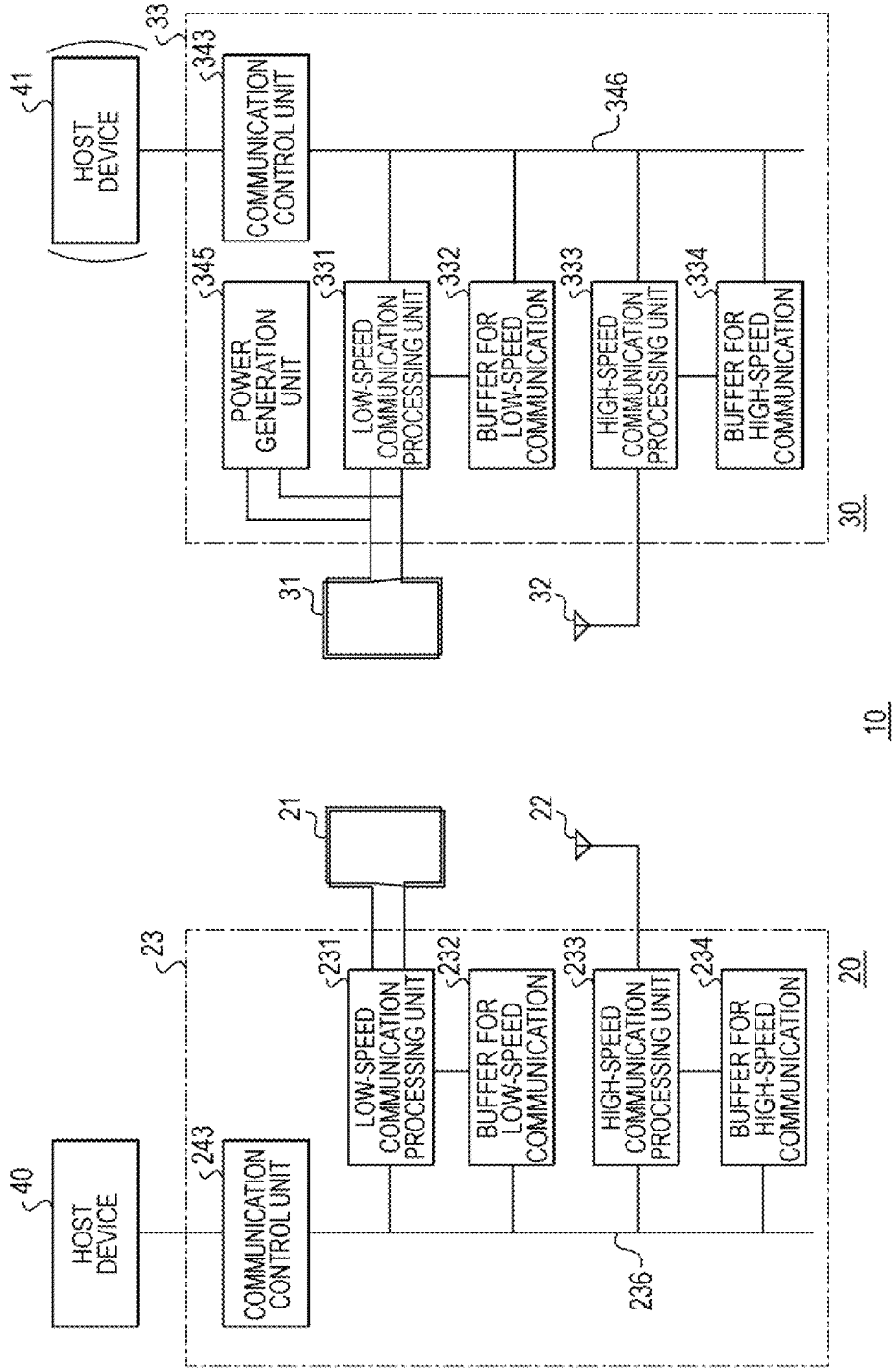
FIG. 1 is a diagram showing a configuration of a wireless communication system.

FIG. 1 shows a configuration of a wireless communication system according to an embodiment. A wireless communication system 10 includes an initiator 20 which starts communication and a target 30 to be a target of the communication.

The initiator 20 is specifically a reader/writer (R/W) complying with near-field wireless communication operating in a reader/writer mode. The reader/writer as the initiator 20 is connected to a host device 40 through a host interface such as a UART (Universal Asynchronous receiver-transmitter). The host device 40 corresponds to a personal computer (PC) or an integrated CPU (Central Processing Unit) inside the reader/writer, which performs generation of transmission data, processing of reception data, generation of communication control signals for controlling communication operations and the like.

The target 30 is a transponder such as the IC card complying with the near-field wireless communication or a reader/ writer complying with near-field wireless communication operating in a card mode (hereinafter, these targets are referred to as merely "cards"). The card (target) 30 may be a standalone-type or may be connected to a host device 41.

Figure 2:
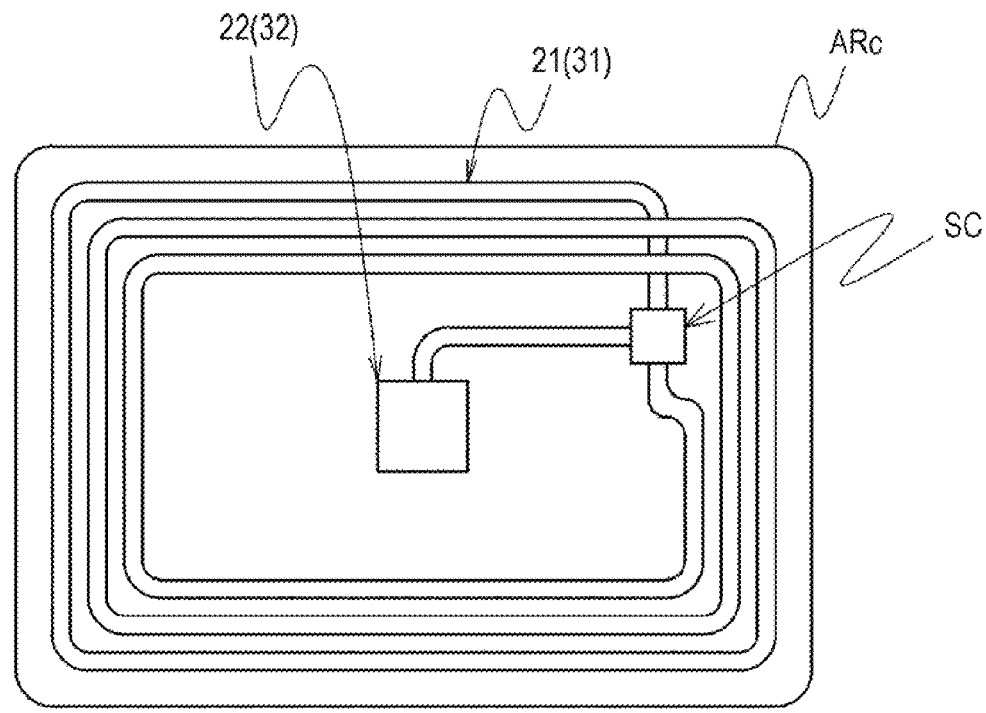
FIG. 2 is a view showing antenna shapes.

The reader/writer (initiator 20) is provided with a first antenna unit 21 and a second antenna unit 22. The card (target) 30 is provided with a first antenna unit 31 and a second antenna unit 32. FIG. 2 shows antenna shapes. When the card 30 has a shape of, for example, 85.6 mm×54.0 mm which is prescribed by ISO/IEC7816-2, JI56301-2 standards and the like, the first antenna unit 21 (31) and the second antenna unit 22 (32) are provided within an area ARc of the card size.

The first antenna unit 21 (31) used for data communication of the related-art near-field wireless communication, for example, the NFCIP-1 type communication is formed by a rectangular antenna coil formed along an outer periphery of the card area. The second antenna unit 22 (32) used for high-speed communication can perform data communication independently without causing mutual interference with respect to communication using the first antenna unit, which is provided, for example, at the center of the card area ARc so as not to interfere with power supply from the reader/writer 20 to the card 30 by the first antenna unit. A control IC chip SC is an integrated circuit of an antenna tuning circuit, a later-described card control unit 33 of the card 30 and the like, to which the first antenna unit and the second antenna unit are connected. In the following description, the first antenna unit 21 is called as a large antenna and a second antenna unit 22 is called as a small antenna.

The large antenna 21 is connected to a communication processing unit (hereinafter, referred to as a "low-speed communication processing unit) 231 for performing data communication of the related-art near-field wireless communication, for example, the NFCIP-1 type communication. The small antenna 22 is connected to a communication processing unit (hereinafter, referred to as a "high-speed communication processing unit) 233 for performing high-speed communication.

The low-speed communication processing unit 231 of a reader/writer control unit 23 performs coding processing of transmission data read from a buffer for low-speed communication 232, modulation processing of coded data obtained by performing the coding processing and the like so as to perform NFCIP-1 type data communication in the same manner as the related art by using the antenna 21. The low-speed communication processing unit 231 generates a transmission signal by performing these processing and supplies the signal to the large antenna 21. The low-speed communication processing unit 231 also performs demodulation processing of a reception signal obtained by the large antenna 21, decoding processing of the demodulated signal obtained by performing the demodulation processing and the like. The low-speed communication processing unit 231 stores reception data obtained by performing these processing in the buffer for low-speed communication 232.

Table 1 shows a transfer direction in the NFCIP-1 type, communication speed, a carrier frequency, a modulation scheme, and a coding scheme with respect to respective communication modes. For example, when a communication system of Felica (trademark) as the NFCIP-1 type data communication is used, the low-speed communication processing unit 231 performs ASK modulation/demodulation processing, Manchester coding/decoding processing and the like.

TABLE 1

| Transfer direction | | A type | B type | Felica | |
|---|---|---|---|---|---|
| | | Communication speed | | | |
| | | 106 kb/s | 106 kb/s | 212 kb/s | 424 kb/s |
| R/W→Card | Carrier frequency | 13.56 MHz | 13.56 MHz | 13.56 MHz | |
| | Modulation scheme | 100% ASK | 10% ASK | 8-30% ASK | |
| | Coding scheme | Deformed mirror | NRZ | Manchester | |
| Card→R/W | Subcarrier frequency | 13.56 MHz/16 | 13.56 MHz/16 | — | |
| | Modulation scheme | Load modulation | Load modulation | >12% ASK load modulation | |
| | Coding scheme | Manchester | BPSK-NRZ-L | Manchester | |

The buffer for low-speed communication 232 is a buffer for temporarily storing reception data supplied from the low-speed communication processing unit 231 and transmission data supplied from a communication control unit 243.

The high-speed communication processing unit 233 performs communication at higher speed than the NFCIP-1 type data communication by using the small antenna 22. The high-speed communication processing unit 233 performs coding processing of transmission data read from a buffer for high-speed communication 234, modulation processing of coded data obtained by performing the coding processing and the like. The high-speed communication processing unit 233 generates a transmission signal by performing these processing and supplies the signal to the small antenna 22. The high-speed communication processing unit 233 also performs demodulation processing of a reception signal obtained by the small antenna 22, decoding processing of the demodulated signal obtained by performing the demodulation processing and the like. The high-speed communication processing unit 233 stores reception data obtained by performing these processing in the buffer for high-speed communication 234.

The high-speed communication processing unit 233 performs a back scatter system, a communication system called as a weak UWB (Ultra Wide Band) using a communication frequency band of 4.48 GHz, a baseband broadband communication in the electromagnetic induction system and the like as the communication system which is higher than the NFCIP-1 type data communication. When using the above systems, data communication at higher speed than the NFCIP-1 type can be performed as shown in Table 2.

TABLE 2

|  | NFCIP-1 system (Felica) | Back scatter system | Weak UWB system |
|---|---|---|---|
| Carrier center frequency | 13.56 MHz | 2.4 GHz | 4.48 GHz |
| Power-consumption Transmission | 100 mW to 199 mW | 600 mW | approx. 100 mW |
| Power-consumption Reception | Several mW | 30 mW | approx. 160 mW |
| Transfer rate | up to 424 kb/s | Several Mb/s (Active) Several dozen Mb/s (Reflective) | 375 Mb/s (Effective) |
| Communication range | up to 10 cm | Several cm | assumed to be within 3 cm |

For example, when the back scatter system is used, the high-speed communication processing unit 233 performs ASK modulation/demodulation processing or PSK modulation/demodulation processing, NRZ-L coding/decoding processing and the like. The high-speed communication processing unit 233, when transmitting the generated transmission signal, modulates a non-modulated carrier signal supplied from the small antenna 32 of the card 30 in accordance with the transmission signal and reflects the signal. The high-speed communication processing unit 233 also generates reception data by receiving the modulated carrier signal supplied from the small antenna 32 of the card 30 and performing demodulation and the like.

The buffer for high-speed communication 234 is a buffer for temporarily storing reception data supplied from the high-speed communication processing unit 233 and transmission data supplied from the communication control unit 243.

The communication control unit 243 is connected to the low-speed communication processing unit 231, the buffer for low-speed communication 232, the high-speed communication processing unit 233 and the buffer for high-speed communication 234 through a bus 236. The communication control unit 243 is also connected to the host device 40. The communication control unit 243 controls operations of respective units based on communication control signals from the host device 40 to perform communication with the card (target) 30 by using the large antenna 21 and the small antenna 22.

The card 30 is provided with the large antenna 31 and the small antenna 32. The large antenna 31 is configured in the same manner as the large antenna 21 of the reader/writer 20, which is connected to a low-speed communication processing unit 331 and a power generation unit 345 in the card control unit 33. The small antenna unit 32 is configured in the same manner as the small antenna 22 of the reader/writer 20, which is connected to the high-speed communication processing unit 333 in the card control unit 33.

The low-speed communication unit 331 performs coding processing of transmission data read from the buffer for the low-speed communication 332, modulation processing of coded data obtained by performing the coding processing and the like. The low-speed communication processing unit 331 generates a transmission signal by performing these processing and supplies the signal to the large antenna 31. The low-speed communication processing unit 331 performs demodulation processing of a reception signal obtained by the large antenna 31, decoding processing of the demodulated signal obtained by performing the demodulation processing and the like. The low-speed communication processing unit 331 stores reception data obtained by performing these processing in the buffer for low-speed communication 332.

The buffer for low-speed communication 332 is a buffer for temporarily storing reception data supplied from the low-speed communication processing unit 331 and transmission data supplied from a communication control unit 343.

The high-speed communication processing unit 333 performs coding processing of transmission data read from the buffer for high-speed processing 334, modulation processing of coded data obtained by performing the coding processing and the like. The high-speed communication processing unit 333 generates a transmission signal by performing these processing and supplies the signal to the small antenna 32. The high-speed communication processing unit 333 also performs demodulation processing of a reception signal obtained by the small antenna 32, decoding processing of the demodulated signal obtained by performing demodulation processing and the like. The high-speed communication processing unit 333 stores reception data obtained by performing these processing in the buffer for high-speed processing 334.

The high-speed communication processing unit 333, when using, for example, the back scatter system, transmits a non-modulated carrier signal from the small antenna 32. The high-speed communication processing unit 333 generates reception data by performing demodulation processing and the like of the modulated carrier signal obtained by receiving reflected waves from the reader/writer 20. Further, the high-speed communication processing unit 333, when generating a transmission signal and transmitting the signal, modulates the carrier signal in accordance with the transmission signal and transmits the signal from the small antenna 32.

The buffer for high-speed communication 334 is a buffer for temporarily storing reception data supplied from the high-speed communication processing unit 333 and transmission data supplied from the communication control unit 343.

The communication control unit 343 is connected to the low-speed communication processing unit 331, the buffer for low-speed communication 332, the high-speed communication processing unit 333 and the buffer for high-speed communication 334 through a bus 346. The communication control unit 343 performs processing in accordance with reception data, performing processing of reading, for example, requested information from a nonvolatile memory (not shown) and generating a transmission signal. When the communication control unit 343 is connected to the host device 41, the communication control unit 343 controls operations of respective units based on communication control signals from the host device 41 to perform communication with the reader/writer (initiator) 20 by using the large antenna 31 and the small antenna 32.

The power generation unit 345 performs rectification, smoothing, voltage conversion and the like to the carrier signal received by the large antenna 31 to generate power which is a prescribed direct-current voltage. The power generation unit 345 further supplies generated power to respective units of the card 30.

[Power Generation Operation in the Wireless Communication System]

Figure 3:
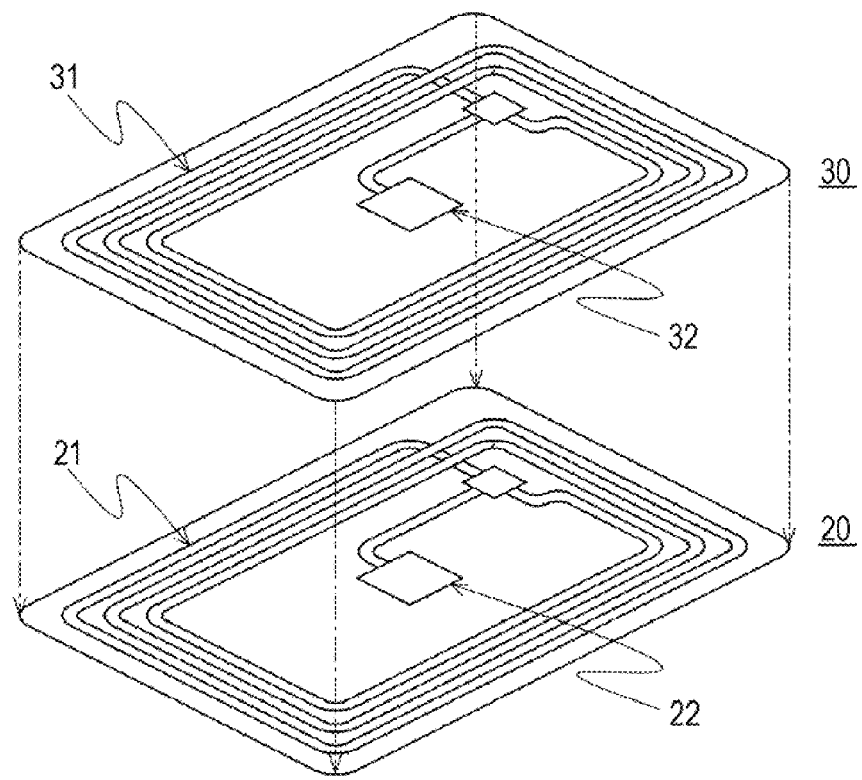
FIG. 3 is a view showing arrangement of a reader/writer and a card.

In the wireless communication system 10 configured as the above, as shown in FIG. 3, data communication is performed by providing the card 30 with respect to the reader/writer 20 so that the large antenna 21 of the reader/writer 20 faces the large antenna 31 of the card 30 as well as the small antenna 22 of the reader/writer 20 faces the small antenna 32 of the card 30, respectively. When the reader/writer 20 and the card 30 are in a close contact state, a frequency resonance characteristic in an antenna resonant circuit of the large antenna 21 (or the large antenna 31) is switched so that generated power will be high.

Figure 4:
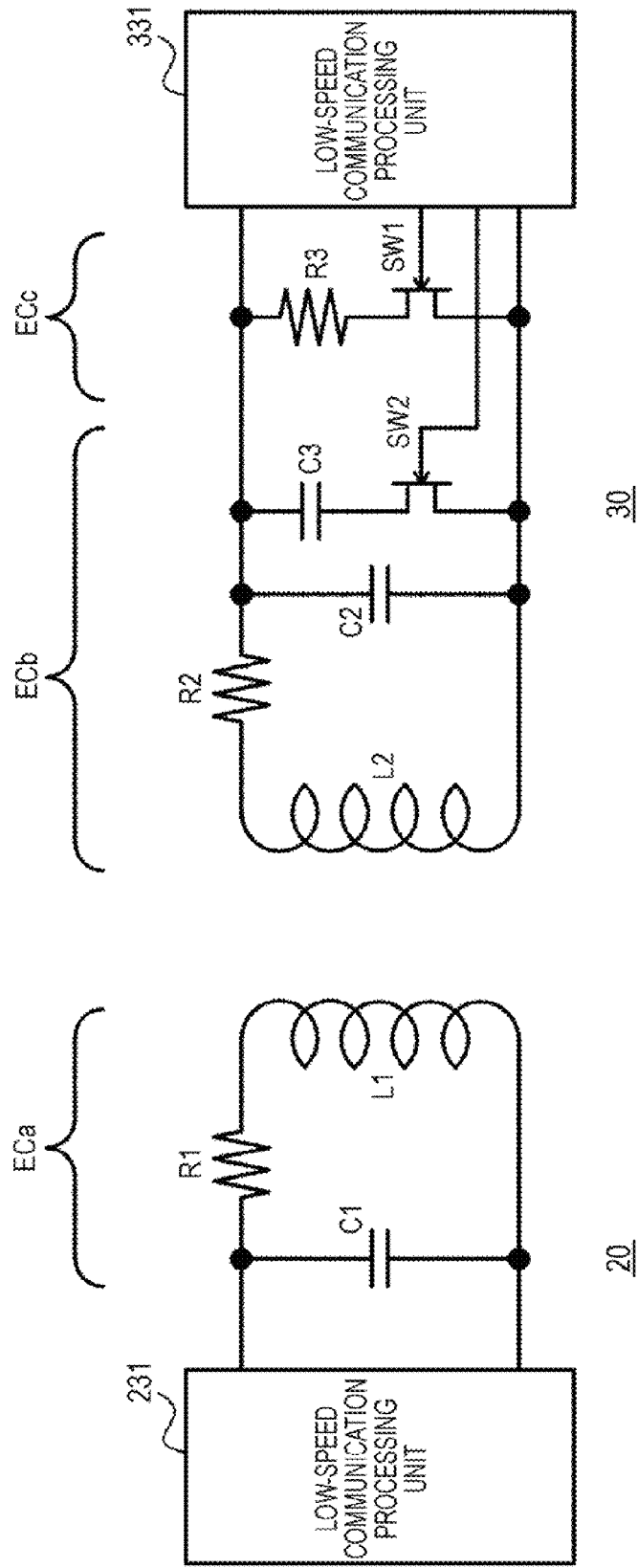
FIG. 4 is a view showing antenna configurations of the reader/writer and the card.

FIG. 4 shows antenna configurations of the large antenna 21 of the reader/writer 20 and the large antenna 31 of the card 30. The large antenna 21 of the reader/writer 20 includes an antenna coil and a resonant circuit, and an equivalent circuit of the large antenna 21 is shown as an antenna resonant circuit ECa. The large antenna 31 of the card 30 includes an antenna coil, a resonant circuit and a load switching modulation circuit for performing amplitude modulation, and an equivalent circuit showing the antenna coil and the resonant circuit is shown as an antenna resonant circuit ECb.

The antenna resonant circuit ECa of the reader/writer 20 includes a resistance R1, a capacitor C1 and a coil L1, which transmits a transmission signal generated by the low-speed communication processing unit 231 to the card 30. The antenna resonant circuit ECa receives a signal transmitted from the card 30 and supplies the signal to the low-speed communication processing unit 331. A unique resonant frequency of the antenna resonant circuit ECa is previously set to a prescribed value by capacitance of the capacitor C1 and inductance of the coil L1.

Figure 5:
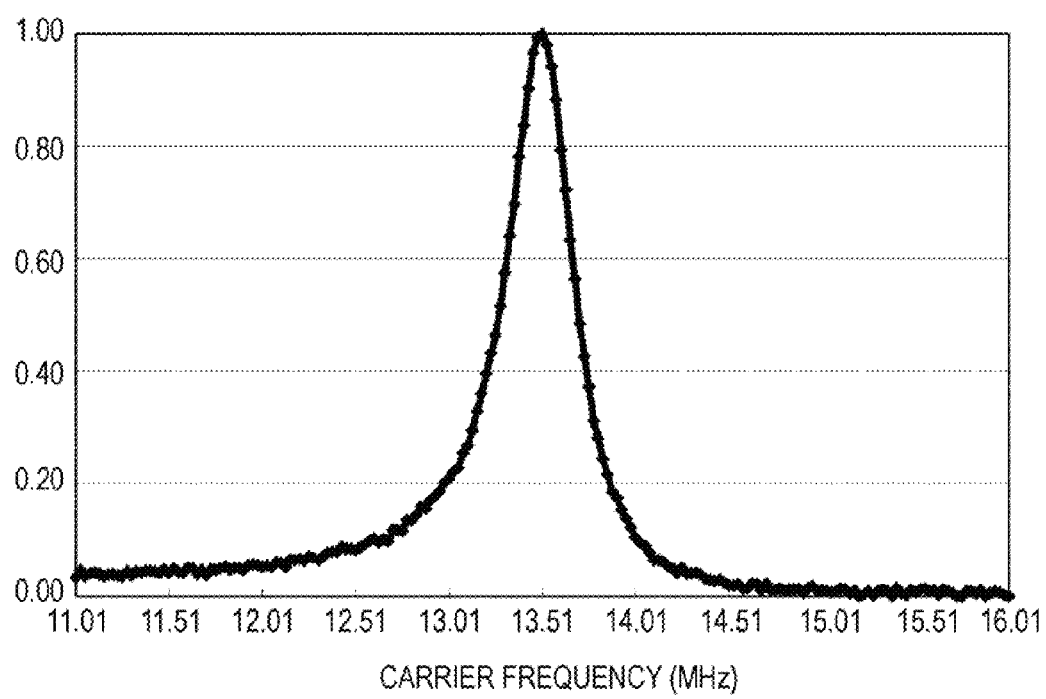
FIG. 5 is a graph showing a frequency resonance characteristic of an antenna unit as an example.

The antenna resonant circuit ECb of the card 30 includes a resistance R2, a capacitor C2 and a coil L2, which transmits a transmission signal generated by the low-speed communication processing unit 331 to the large antenna side of the reader/writer 20, which is modulated by performing ASK modulation according to whether a resistant R3 is inserted in the circuit or not by a switch SW1 of the load switching modulation circuit ECc. The antenna resonant circuit ECb receives a signal transmitted from the reader/writer 20 and supplied the signal to the low-speed communication processing unit 331. A resonant frequency of the antenna resonant circuit ECb is previously set to a prescribed value by capacitance of the capacitor C2 and inductance of the coil L2. FIG. 5 shows a frequency resonance characteristic in the antenna resonant circuit as an example.

When the power necessary in the card 30 is high, the frequency resonance characteristic is switched by changing, for example, the antenna capacity by a switch SW2 of the card 30, thereby increasing the power generated in the power generation unit 345.

Figure 6A:
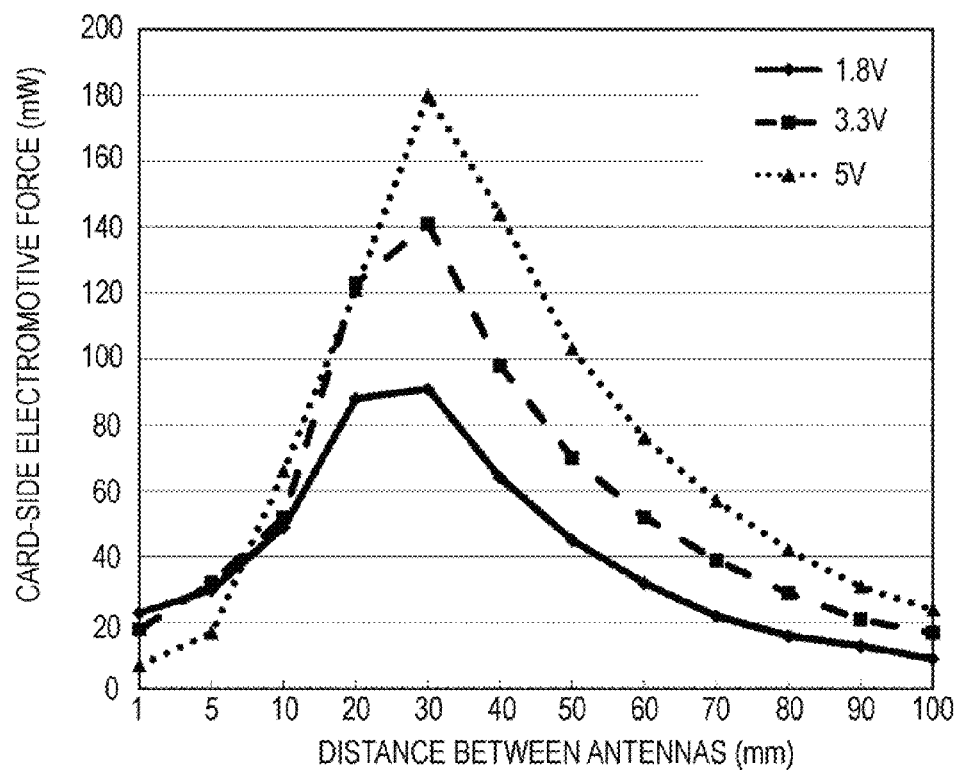
FIG. 6A and FIG. 6B are graphs showing the relation between the electromotive force and the distance between antennas.
Figure 7A:
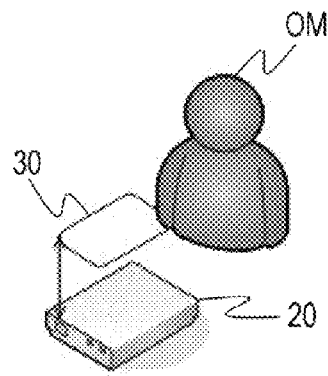
FIG. 7A and FIG. 7B are views showing the positional relation between the reader/writer and the card.

FIG. 6A shows the relation between the electromotive force generated in the power generation unit 345 and the distance between antennas at respective operation voltages (5V, 3.3V and 1.8V) when the frequency resonance characteristic of the reader/writer 20 and the card 30 are as shown in FIG. 5. Both the reader/writer 20 and the card 30 are designed so that the quality factor is high in the vicinity of the carrier frequency (13.56 MHz) as a steep frequency resonance characteristic, the electromotive force becomes maximum when the distance between antennas is approximately 30 mm. That is, as shown in FIG. 7A, the electromotive force becomes maximum when a person OM takes the card 30 in his hand and holds up to the reader/writer 20.

However, there is a physical characteristic that, when the distance between antennas is short and the reader/writer 20 comes close to the card 30, trans coupling factor becomes dominant, therefore, the resonant frequency as a system deviates from the carrier frequency. Therefore, it is difficult to obtain power in the close contact state because the electromotive force becomes small.

Figure 6B:
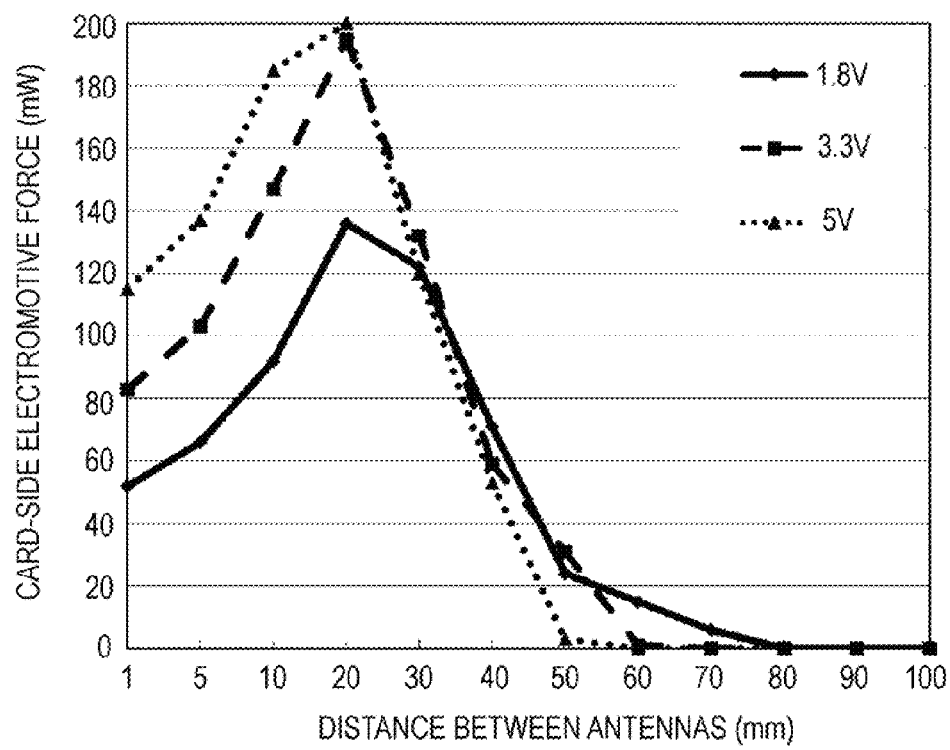
Figure 7B:
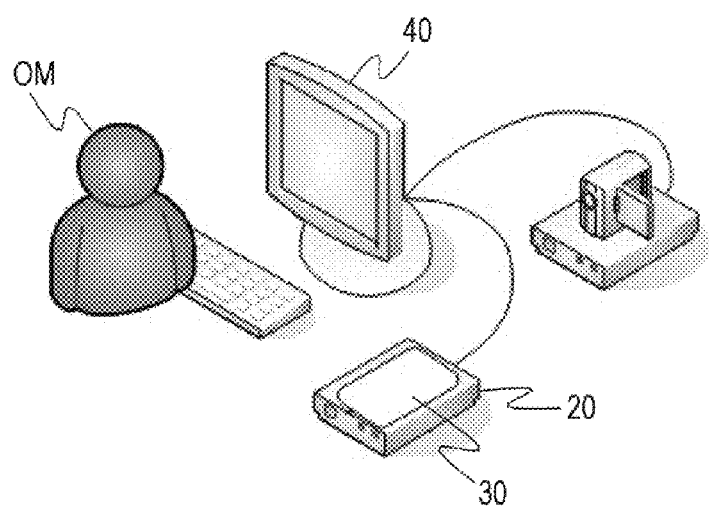

FIG. 6B shows the relation between the electromotive force generated in the power generation unit 345 and distance between antennas at respective operation voltages (5V, 3.3V and 1.8V) when the frequency resonance characteristic is allowed to be approximately flat so as to be in a non-resonant state by making the quality factor of the card 30 to be lower than the characteristic shown in FIG. 5. In this case, the electromotive force becomes maximum when an interval between the large antenna 21 of the reader/writer 20 and the large antenna 31 of the card 30 is approximately 20 mm. When the large antenna 21 of the reader/writer 20 and the large antenna 31 of the card 30 are in the close contact state, the electromotive force is higher than FIG. 6A. That is, as shown in FIG. 7B, when content data is written in the card 30 from the host device 40 or when data written in the card 30 is read by the host device 40 in the state in which the reader/writer 20 is placed on the card 30, high electromotive power can be obtained.

As described above, when the antenna resonant circuit is made to be the non-resonant state by reducing the quality factor, it is possible to increase power to be generated in the power generation unit 345 when the large antenna 21 of the reader/writer 20 and the large antenna 31 of the card 30 are in the close contact state. The switching of the frequency resonance characteristic is not limited to the case performed in the card 30 but it is also preferable that the switching is performed in the reader/writer 20.

[Communication Operations in the Wireless Communication System]

Figure 8:
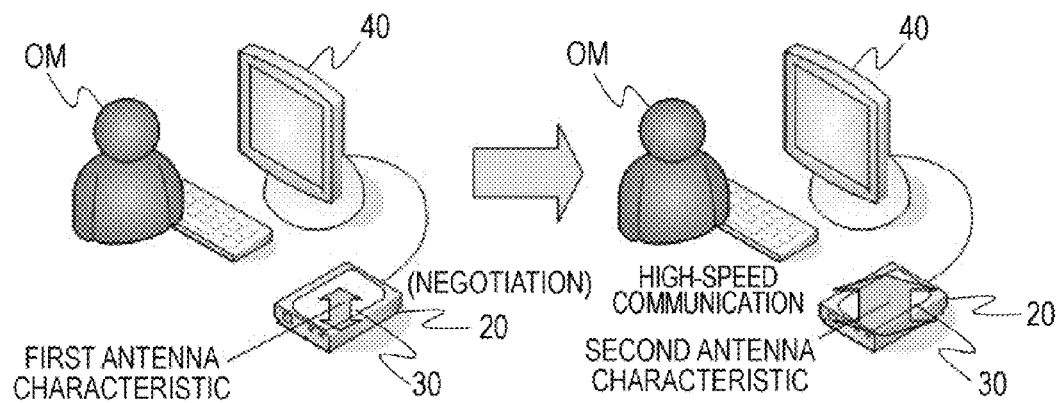
FIG. 8 is a view showing a state in which high-speed communication is performed between the reader/writer and the card.

Next, operations of the wireless communication system 10 will be explained. FIG. 8 shows a state in which high-speed communication is performed between the reader/writer 20 and the card 30. When high-speed communication is performed between the reader/writer 20 and the card 30, the card 30 is placed on the reader/writer 20 and negotiation is performed between the reader/writer 20 and the card 30 by using the electromagnetic induction system to thereby performing high-speed communication using the back scatter system. In the high-speed communication in the back scatter system, data communication is performed by transmitting a non-modulated carrier signal from the card 30, modulating the non-modulated carrier signal in accordance with the transmission signal and reflecting the signal in the reader/writer 20. According to the negotiation, for example, in the card 30, the frequency resonance characteristic is changed from the characteristic (first characteristic) in which the quality factor is high to the characteristic (second characteristic) in which the frequency characteristic is allowed to be approximately flat by reducing the quality factor so that power to be generated in the power generation unit 345 is increased.

Figure 9:
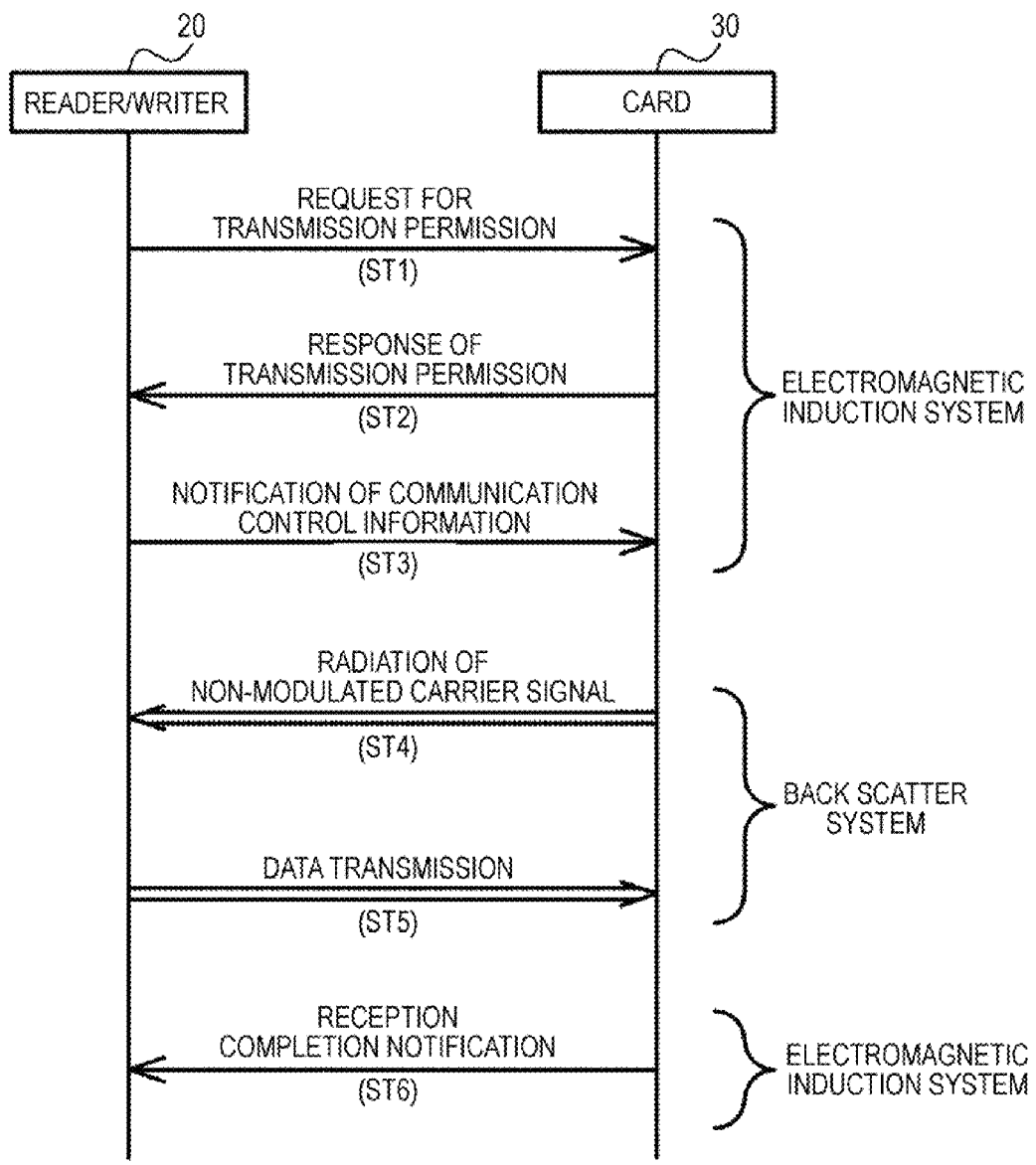
FIG. 9 is a diagram showing a sequence of communication operations.

FIG. 9 shows a sequence of communication operations. The reader/writer 20, when performing data communication with the card 30 at high speed, requests the card 30 to permit transmission by the electromagnetic induction system (ST1).

The host device 40 supplies a communication control signal to the communication control unit 243 of the reader/writer 20 when transmitting data to the card 30.

The communication control unit 243 controls operation of the low-speed communication processing unit 231 based on communication control information to transmit a modulated carrier signal indicating the request for transmission permission as a transmission signal from the large antenna 21. The communication control unit 243 supplies a non-modulated carrier signal to the large antenna 21 as the transmission signal until communication completion notification is supplied from the host device 40 so as to perform near-field wireless communication in the electromagnetic induction system.

When a reception signal, that is, the non-modulated carrier signal or the modulated carrier signal is obtained by the large antenna 31 of the card 30, the power generation unit 345 generates power from the carrier signal, supplying the generated power to respective units to operate the card 30. The low-speed communication processing unit 331 performs demodulation of the received modulated carrier signal and decoding of modulated data, supplying obtained reception data to the communication control unit 343. That is, the request transmission permission transmitted from the reader/writer 20 is supplied to the communication control unit 343.

The card 30 makes a response of transmission permission when permitting communication using the high-speed communication processing unit 333 (ST2).

The communication control unit 343 of the card 30, when permitting communication using the high-speed communication processing unit 333, generates the response of transmission permission and supplies the response to the low-speed communication processing unit 331. The low-speed communication processing unit 331 performs coding and modulation of transmission data indicating the response of transmission permission to generate a transmission signal. The low-speed communication processing unit 331 also modulates the non-modulated carrier signal transmitted from the reader/writer 20 in accordance with the transmission signal.

The low-speed communication processing unit 231 of the reader/writer 20 performs demodulation and decoding the carrier signal modulated in the card 30, supplying obtained reception data to the communication control unit 243. That is, the response of transmission permission transmitted from the card 30 is supplied to the communication control unit 243.

The communication control unit 243 of the reader/writer 20 performs notification of communication control information based on the supply of the response of transmission permission from the card 30 (ST3).

The communication control unit 243 of the reader/writer 20 supplies the communication control information supplied from the host device 40 to the low-speed communication processing unit 231.

The low-speed communication processing unit 231 of the reader/writer 20 performs coding and modulation of the communication control information, generating a modulated carrier signal indicating the communication control information and transmitting the signal from the large antenna 21. The low-speed communication processing unit 331 of the card 30 receives the modulated carrier signal transmitted from the large antenna 31, performing demodulation and decoding of the modulated carrier signal, and supplying obtained reception data to the communication control unit 343. That is, the communication control information transmitted from the reader/writer 20 is supplied to the communication control unit 343.

The communication control unit 343 of the card 30 performs setting of data communication by using the high-speed communication processing unit 333 based on the communication control information, radiating a non-modulated carrier signal as a radio signal from the small antenna 32 connected to the high-speed communication processing unit 333 so as to perform high-speed data communication with the reader/writer 20 (ST4). In the case that the communication control information includes information indicating data size, data communication operation using the high-speed data communication unit can be completed when data reception of the size indicated by the communication control information is completed.

The communication control unit 343 of the card 30 performs operation control of the high-speed communication processing unit 333 so that data communication can be performed with the reader/writer 20 in a transmission speed and a format indicated by the communication control information. The communication control unit 343 radiates a non-modulated carrier signal of, for example, 2.45 GHz from the small antenna 32 so as to perform high-speed data communication with the reader/writer 20. The communication control unit 343 further changes the frequency resonance characteristic to the characteristic which is allowed to be approximately flat (second characteristic) by reducing the quality factor of the antenna resonant circuit of the large antenna 31 so as to obtain high power.

The high-speed communication processing unit 233 of the reader/writer 20 performs data transmission by using the non-modulated carrier signal radiated from the card 30 (ST5).

The communication control unit 243 of the reader/writer 20 writes transmission data supplied from the host device 40 in the buffer for high-speed communication 234 sequentially. The high-speed communication processing unit 233 reads transmission data written in the buffer for high-speed communication 234 sequentially, modulating the non-modulated carrier signal radiated from the card 30 and reflecting the signal based on the transmission signal generated by performing coding and modulation of the transmission data.

The high-speed communication processing unit 333 of the card 30 receives a reflected-wave signal from the reader/writer 20, performing demodulation and decoding of the obtained reception signal, generating reception data and supplies the data to the communication control unit 343.

The card 30 notifies the reader/writer 20 of reception completion when data communication of the size notified in advance is completed (ST6).

The communication control unit 343 of the card 30 supplies the reception completion notification to the low-speed communication processing unit 331 when data communication of the size notified in advance is completed. The communication control unit 343 returns the frequency resonance characteristic of the antenna resonant circuit of the large antenna 31 to the first characteristic which is the previous frequency resonance characteristic in which the quality factor is high. The low-speed communication processing unit 331 performs coding and modulation of transmission data indicating the reception completion notification to generate a transmission signal. The low-speed communication processing unit 331 modulates the non-modulated carrier signal from the reader/writer 20 in accordance with the transmission signal. Further, the communication control unit 343 completes operation of the high-speed communication processing unit 333 to stop radiation of the non-modulated carrier signal when data communication is completed.

The low-speed communication processing unit 231 of the reader/writer 20 performs demodulation and decoding of the carrier signal modulated in the card 30, supplying obtained reception data from the communication control unit 243 to the host device 40. That is, the reception completion notification transmitted from the card 30 to the host device 40.

The host device 40 completes operation of the low-speed communication processing unit 231 of the reader/writer 20 to stop supply of the non-modulated carrier signal to the large antenna 21 when the reception completion notification is supplied. The control of processing of stopping the non-modulated carrier signal may be performed by the communication control unit 243.

As described above, the card 30 switches the frequency resonance characteristic when performing the high-speed communication, thereby generating high power in the power generation unit 345 even when the large antenna 21 of the reader/writer 20 and the large antenna 31 of the card 30 are in the close contact state.

Second Embodiment

[Another Configuration of the Wireless Communication Device]

In the near-field wireless communication system using the electromagnetic induction system, it is possible to increase power to be generated in the power generation unit 345 by changing the frequency resonance characteristic in the antenna unit even when the large antenna 21 of the reader/writer 20 and the large antenna 31 of the card 30 are in the close contact state. Accordingly, the wireless communication device is applied to a playback device, and a playback device 30a, that is, the target including a content playback unit is placed on the reader/writer 20 and content data is supplied from the reader/writer 20 to the playback device 30a, playback of contents can be performed without providing a battery and the like at the playback device 30a. That is, the playback device of passive operation without the power supply can be realized.

Figure 10:
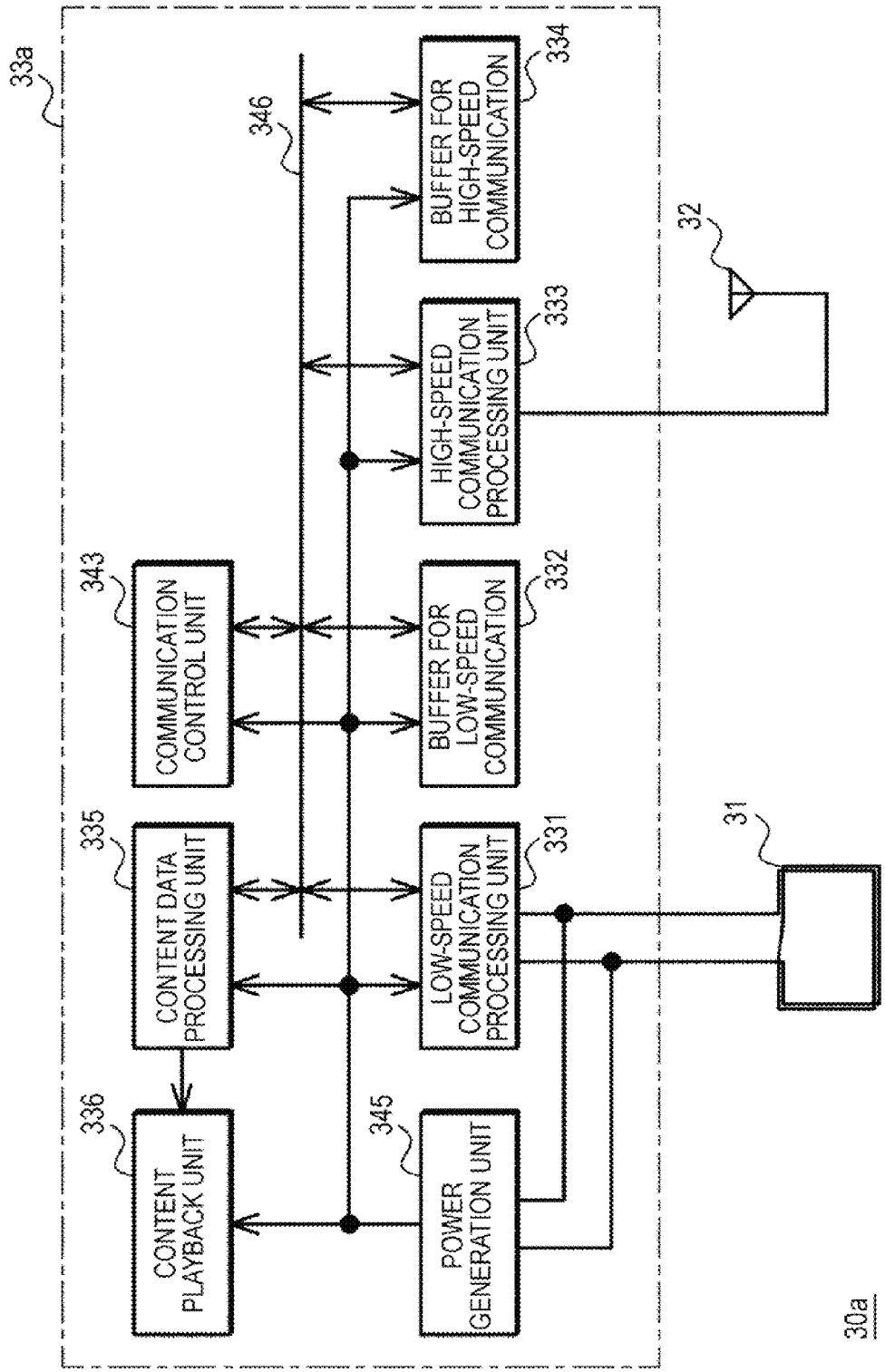
FIG. 10 is a diagram showing a configuration of a playback device.

FIG. 10 shows a configuration of the playback device 30a as a target. The playback device 30a is provided with a large antenna 31 and a small antenna 32. The large antenna 31 is configured in the same manner as the large antenna 21 of the reader/writer 20, which is connected to the low-speed communication processing unit 331 and the power generation unit 345 in the card control unit 33a. The small antenna 32 is configured in the same manner as the small antenna 22 of the reader/writer 20, which is connected to the high-speed communication processing 333 in the card control unit 33a.

The low-speed communication processing unit 331 performs coding processing of transmission data read from the buffer for low-speed communication 332, modulation processing of coded data obtained by performing the coding processing and the like. The low-speed communication processing unit 331 generates a transmission signal by performing these processing and supplies the signal to the large antenna 31. The low-speed communication processing unit 331 performs demodulation processing of a reception signal obtained by the large antenna 31, decoding processing of the demodulated signal obtained by performing the demodulation processing and the like. The low-speed communication processing unit 331 stores reception data obtained by performing these processing in the buffer for low-speed communication 332.

The buffer for low-speed communication 332 is a buffer for temporarily storing reception data supplied from the low-speed communication processing unit 331 and transmission data supplied from the communication control unit 343.

The high-speed communication processing unit 333 performs coding processing of transmission data read from the buffer for high-speed communication 334, modulation processing of coded data obtained by performing the coding processing and the like. The high-speed communication processing unit 333 generates a transmission signal by performing these processing and supplies the signal to the small antenna 32. The high-speed communication processing unit 333 also performs demodulation processing of a reception signal obtained by the small antenna 32, decoding processing of the demodulated signal obtained by performing the demodulation processing and the like. The high-speed communication processing unit 333 stores reception data obtained by performing these processing in the buffer for high-speed communication 334. When using the back scatter system, the high-speed communication processing unit 333 transmits a non-modulated carrier signal from the small antenna 32. The high-speed communication processing unit 333 generates reception data by performing demodulation processing and the like of the modulated carrier signal obtained by receiving reflected waves from the reader/writer 20 by the small antenna 32.

The buffer for high-speed communication 334 is a buffer for temporarily storing reception data supplied from the high-speed communication processing unit 333 and transmission data supplied from the communication control unit 343.

A content data processing unit 335 generates a playback signal by reading content data supplied from the reader/writer 20 through the small antennas 22, 32 from the buffer for high-speed communication 334 and processing the data. The content data processing unit 335 performs expansion/decoding processing and the like as the processing, for example, when content data read from the buffer for high-speed communication 334 is compressed/coded.

A content playback unit 336 performs playback of a content by using the playback signal generated in the content data processing unit 335. For example, when the playback signal is a signal of a video content, a video display is performed based on the playback signal. When the playback signal is a signal of an audio content, audio output is performed based on the playback signal.

The communication control unit 343 is connected to the low-speed communication processing unit 331, the buffer for low-speed communication 332, the high-speed communication processing unit 333, the buffer for high-speed communication 334, the content data processing unit 335 and the content playback unit 336 through the bus 346. The communication control unit 343 performs communication with the reader/writer 20, receiving content data transmitted from, for example, the reader/writer 20, and performing video display and audio output by the content playback unit 336 based on the received content data.

The power generation unit 345 performs rectification, smoothing, voltage conversion and the like to the carrier signal received by the large antenna 31 to generate power which is a prescribed direct-current voltage. The power generation unit 345 further supplies generated power to respective units of the playback unit 30a.

[Operations When the Wireless Communication Device is Applied to the Playback Device]

Figure 11A:
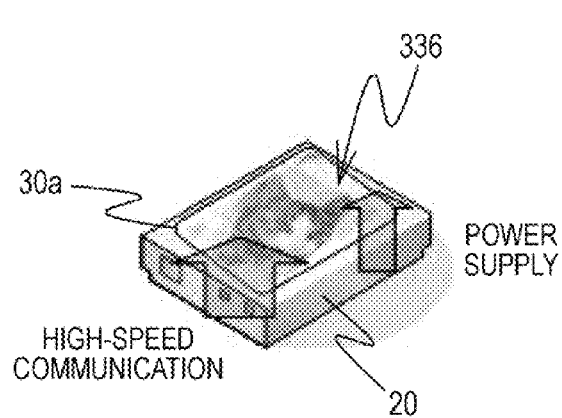
FIG. 11A and FIG. 11B are views for explaining operations of the playback device.

FIG. 11A shows a case in which content data of a video content is transmitted from the reader/writer 20 to the playback device 30a to perform video display in the content playback unit 336 of the playback device 30a.

The communication control unit 343 of the playback device 30a, when performing playback of content data, switches the frequency resonance characteristic of the large antenna 31 to the characteristic which is approximately flat to be a non-resonant state by reducing the quality factor so as to obtain high power.

The playback device 30a performs communication of content data with the reader/writer 20 by using the small antenna 32, storing reception data obtained by the high-speed communication processing unit 333 in the buffer for high-speed communication 334. The content data processing unit 335 generates a content playback signal by reading reception data stored in the buffer for high-speed communication 334 sequentially and performing expansion processing and the like. The content data processing unit 335 supplies the generated content playback signal to the content playback unit 336.

The content playback unit 336 is configured by using a liquid crystal display device, an organic EL display device and the like. The content playback unit 336 performs video display based on the content playback signal.

Figure 11B:
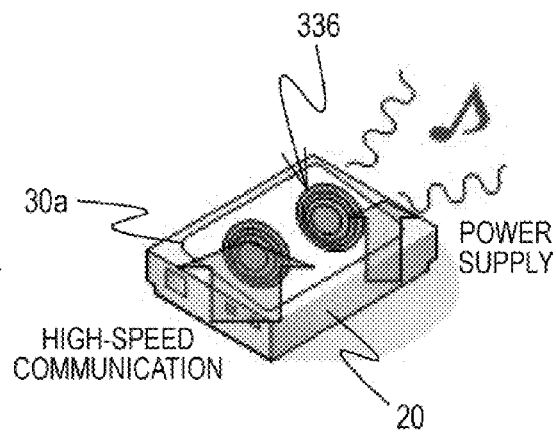

FIG. 11B shows a case in which content data of an audio content is transmitted from the reader/writer 20 to the playback device 30a and audio output is performed in the content playback unit 336 of the playback device 30a.

The communication control unit 343 of the playback device 30a, when performing playback of content data, switches the frequency resonance characteristic of the large antenna 31 to the characteristic which is approximately flat to be a non-resonant state by reducing the quality factor so as to obtain high power.

The playback device 30a stores reception data in the buffer for high-speed communication 334, which is obtained by the high-speed communication processing unit 333 when performing communication with the reader/writer 20 by using the small antenna 32. The content data processing unit 335 generates a content playback signal by reading reception data stored in the buffer for high-speed communication 334 sequentially, performing expansion processing and the like. The content data processing unit 335 supplies the generated content playback signal to the content playback unit 336.

The content playback unit 336 is configured by using a speaker and the like. The content playback unit 336 performs audio output from the speaker based on the content playback signal.

When the playback device 30a is provided with a tuner in addition to the display device, the speaker and the like, it is possible to view television programs and the like.

It is also preferable that the playback device 30a is provided with a memory unit and a memory processing unit which performs writing/reading of data with respect to the memory unit, in which content data transmitted from the reader/writer 20 in the memory unit.

Figure 12:
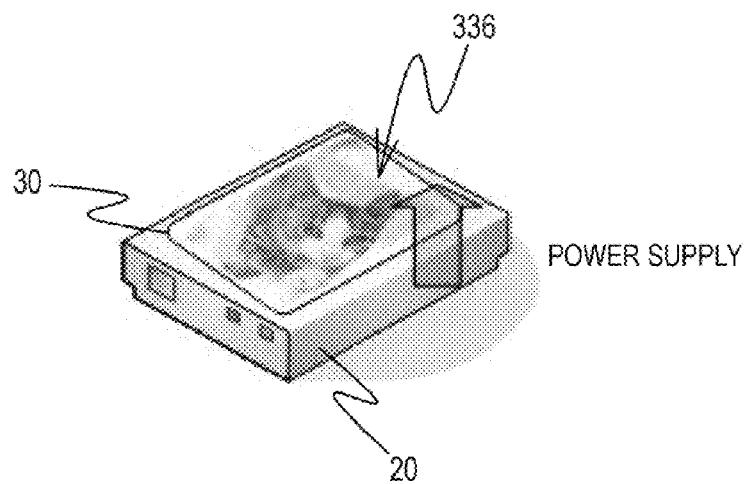
FIG. 12 is a view for explaining another operation of the playback device.

In this case, as shown in FIG. 12, the playback device 30a can play back contents stored in the memory unit by supplying power from the reader/writer 20 to the playback device 30a even when the playback device 30a does not acquire content data by performing communication with the reader/writer 20.

When the playback device 30a is configured as described above, the playback device 30a can perform video display and audio output in a state of being placed on the reader/writer 20 without providing a battery in the playback device 30a. Since the playback device 30a can perform data communication and power supply in a non-contact manner, it is not necessary to form an opening and the like for a connection interface. Therefore, it is possible to provide the playback device 30a which is dustproofed and waterproofed simply and easily. It is also not necessary to provide a power supply unit and a communication interface unit in the playback device 30a. Therefore, it is easy to allow the playback device 30a to be light in weight and thin in thickness. The playback device 30a also does not have a mechanical structure or a contact point. Therefore, it is possible to provide the playback device 30a which is trouble free and reliable. Additionally, the playback device 30a can have a user interface function by the device itself by using a touch panel and the like as an internal device.

Furthermore, the frequency resonance characteristic in the playback device 30a can be switched between the first characteristic in which the quality factor is high as in related arts and the second characteristic in which the frequency characteristic is allowed to be approximately flat by reducing the quality factor so as to generate higher power, thereby having various mode functions.

In the playback device 30a, the frequency resonance characteristic of the large antenna is the first characteristic when, for example, in an existing close communication compatibility mode. The playback device 30a stores identification information or individual information and the like unique to the user in the memory. According to this, it is possible that the playback device 30a can perform communication in the same distance as the IC card and the like having the existing close communication function and can be used as an individual authentication or an electronic payment card compatible with the NFCIP-1.

The playback device 30a performs negotiation in the NFCIP-1 type communication and performs high-speed communication using the small antenna in a large-capacity high-speed storage mode. The playback device 30a switches the frequency resonance characteristic of the large antenna 31 from the previous characteristic to the characteristic in which high power can be generated even in the close contact state. According to this, the playback device 30a can obtain high power even when the device and the reader/writer 20 are in the close contact state, therefore, it is possible to perform high-speed communication, for example, by transmitting a non-modulated carrier signal from the small antenna 32 of the playback device 30a. The received data signal is stored in the memory. The buffer for the high-speed communication 334 may also be used as the memory. It is also preferable that the playback device 30a maintains the frequency resonance characteristic of the large antenna 31 in the state of the first characteristic of related arts when the power necessary for high-speed communication is low.

The playback device 30a performs negotiation in the NFCIP-1 type communication and switches the frequency resonance characteristic of the large antenna 31 from the previous first characteristic to the second characteristic in which high power can be generated in the close contact state in an AV device mode. According to this, the playback device 30a can obtain high power, therefore, it is possible to perform video display and audio output by operating the content data processing unit, the content playback unit and the like. It is also preferable that content data stored in the memory is used as content data used for playback, and that content data is acquired from the reader/writer 20 by performing high-speed communication by using the small antenna.

Third Embodiment

[Another Configuration of the Wireless Communication Device]

The frequency resonance characteristic of the antenna unit is changed as described above, thereby increasing power generated in the power generation unit 345 when the large antenna 21 of the reader/writer 20 and the large antenna 31 of the card 30 are in the close contact state. Therefore, for example, when the wireless communication device is provided as a power receiving device with respect to a power supply module configured by using a battery, it is possible to perform charging of a target which is a power supply module 30b by using power generated in the power generation unit 345.

Figure 13:
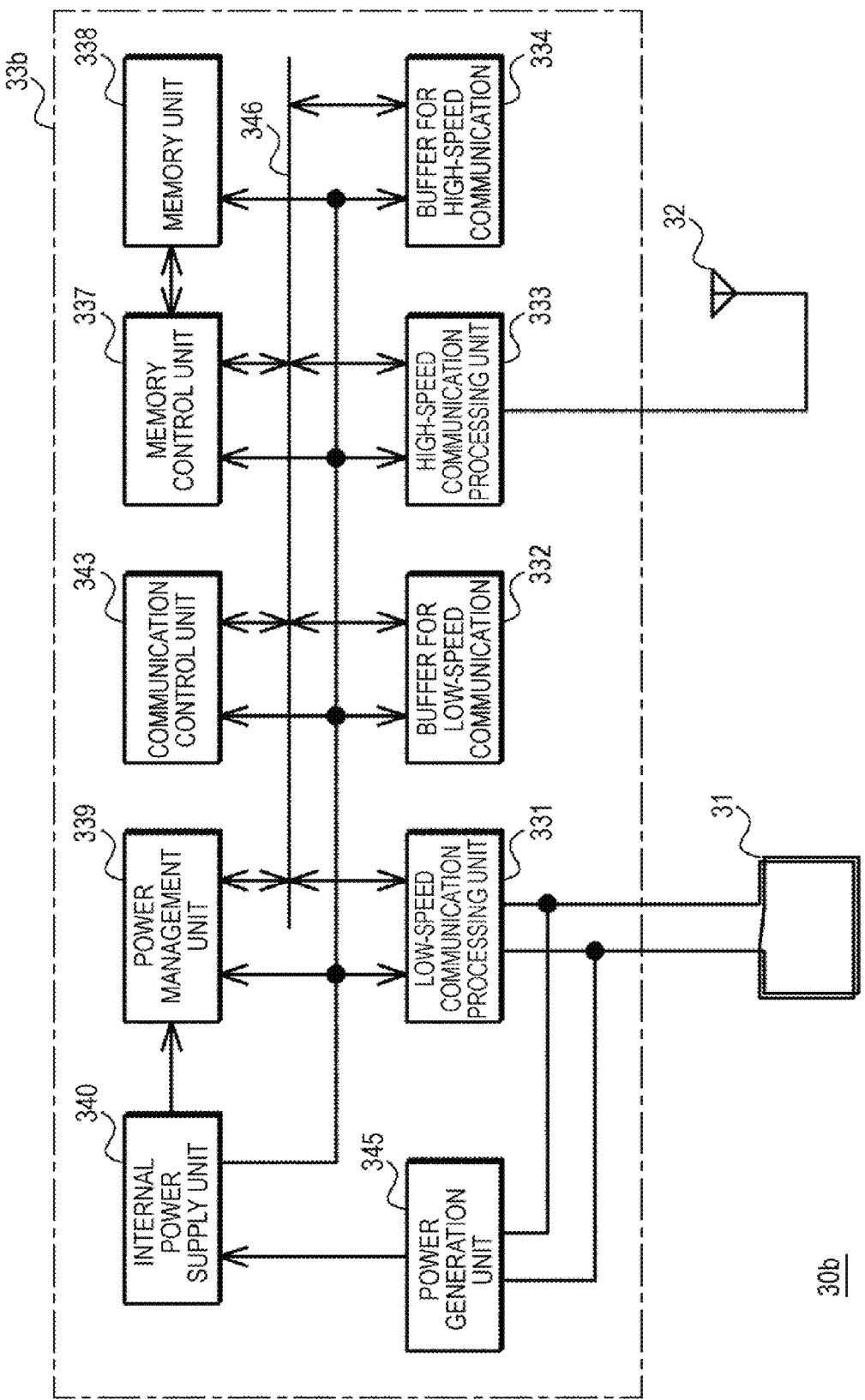
FIG. 13 is a diagram showing a configuration of a power supply module.

FIG. 13 shows a configuration of the power supply module 30b as the target. The power supply module 30b is provided with the large antenna 31 and the small antenna 32. The large antenna 31 is configured in the same manner as the large antenna 21 of the reader/writer 20, which is connected to the low-speed communication processing unit 331 and the power generation unit 345 in the card control unit 33b. The small antenna 32 is configured in the same manner as the small antenna 22 of the reader/writer 20, which is connected to the high-speed communication processing 333 in the card control unit 33b.

The low-speed communication processing unit 331 performs coding processing of transmission data read from the buffer for low-speed communication 332, modulation processing of coded data obtained by performing coding processing and the like. The low-speed communication processing unit 331 generates a transmission signal by performing these processing and supplies the signal to the large antenna 31. The low-speed communication processing unit 331 also performs demodulation processing of a reception signal obtained by the large antenna 31, decoding processing of the demodulated signal obtained by performing the demodulation processing and the like. The low-speed communication processing unit 331 stores reception data obtained by performing these processing in the buffer for low-speed communication 332.

The buffer for low-speed communication 332 is a buffer for temporarily storing reception data supplied from the low-speed communication processing unit 331 and transmission data supplied from the communication control unit 343.

The high-speed communication processing unit 333 performs coding processing of transmission data read from the buffer for high-speed communication 334, modulation processing of coded data obtained by performing the coding processing and the like. The high-speed communication processing unit 333 generates a transmission signal by performing these processing and supplies the signal to the small antenna 32. The high-speed communication processing unit 333 also performs demodulation processing of a reception signal obtained by the small antenna 32, decoding processing of the demodulated signal obtained by performing demodulation processing and the like. The high-speed communication processing unit 333 stores reception data obtained by performing these processing in the buffer for high-speed communication 334. When the back-scatter system is used, the high-speed communication processing unit 333 transmits a non-modulated carrier signal from the small antenna 32. The high-speed communication processing unit 333 also generates reception data by performing demodulation processing of the modulated carrier signal obtained by receiving reflected waves from the reader/writer 20 by the small antenna 32.

The buffer for high-speed communication 334 is a buffer for temporarily storing reception data supplied from the high-speed communication processing unit 333 and transmission data supplied from the communication control unit 343.

A memory control unit 337 performs processing of reading reception data stored in the buffer for high-speed communication 334 and writing the data in a memory unit 338, and processing of reading data stored in the memory unit 338 and temporarily storing the data in the buffer for high-speed communication 334 as transmission data.

An internal power supply unit 340 using a secondary battery is connected to a power supply management unit 339. The power management unit 339 detects the remaining amount of the battery of the internal power supply unit 340, generating power supply information indicating the detection result and supplying the information to the buffer for low-speed communication 332 and the buffer for high-speed communication 334.

The internal power supply unit 340 supplies power to respective units in the power supply module 30b. The internal power supply unit 340 performs charging of a battery by using power generated in the connected power generation unit 345.

The communication control unit 343 is connected to the low-speed communication processing unit 331, the buffer for low-speed communication 332, the high-speed communication processing unit 333 and the buffer for high-speed communication 334 through the bus 346. The communication control unit 343 performs processing in accordance with reception data, for example, performing processing of reading requested information from the memory unit and generating a transmission signal to be transmitted, processing of generating a transmission signal indicating power supply information and transmitting the signal.

The power generation unit 345 performs rectification, smoothing, voltage conversion and the like to the carrier signal received by the large antenna 31 to generate power which is a prescribed direct-current voltage. Further, the power generation unit 345 supplies the generated power to the internal power supply unit 340. When the wireless communication device is provided only as the power receiving device, it is not always necessary to have the high-speed communication processing unit 333 and the buffer for high-speed communication 334.

[Operations When the Wireless Communication Device is Applied to the Power Supply Module]

Figure 14A:
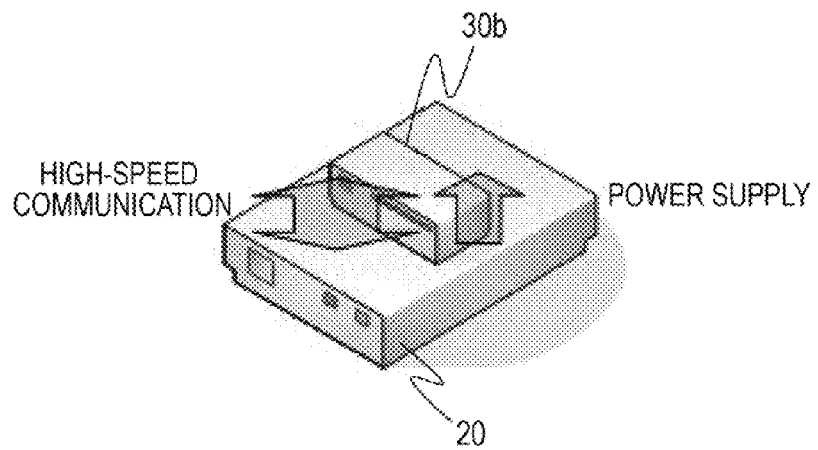
FIG. 14A and FIG. 14B are views for explaining operations when using the power supply module.

FIG. 14A is a view for explaining operations when charging the power supply module 30b. When charging the power supply module 30b, the power supply module 30b is placed on the reader/writer 20 so that the large antenna 31 faces the large antenna 21 of the reader/writer 20.

When performing the charging operation, the communication control unit 343 switches the frequency resonance characteristic of the large antenna 31 to the second characteristic which is allowed to be approximately flat by reducing the quality factor so as to increase power generated in the power generation unit 345.

The power supply module 30b performs communication with the reader/writer 20 by using the small antenna 32, thereby storing reception data stored in the buffer for high-speed communication 334 in the memory unit 338 by the memory control unit 337 when receiving content data and the like.

The power generation unit 345 performs power generation by using the carrier signal received by the large antenna 31, supplying the generated power to the internal power supply unit 340. The internal power supply unit 340 charges the battery by using power supplied from the power generation unit 345.

Figure 14B:
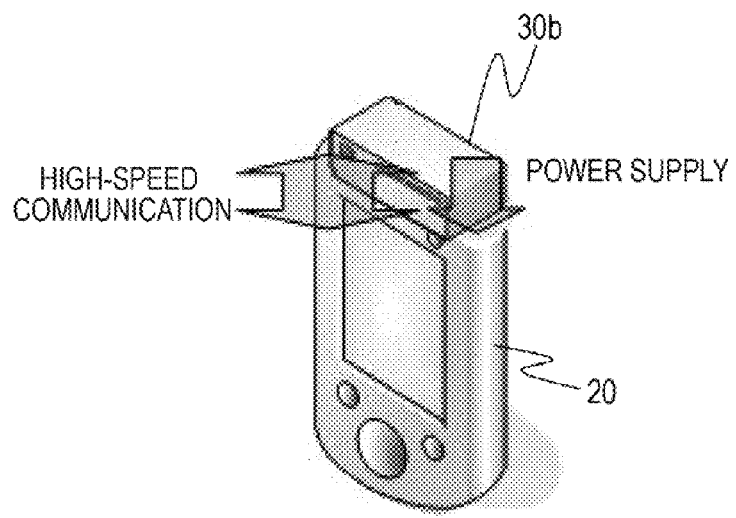

FIG. 14B is a view for explaining operations when performing power supply with respect to an external device 45 from the power supply module 30b. In the external device 45, the antennas and communication processing units performing communication with the power supply module 30b are configured in the same manner as the reader/writer 20. The external device 45 is provided with the power generation unit which generates power from the carrier signal received by the large antenna.

When performing power supply with respect to the external device 45 from the power supply module 30b, the power supply module 30b is placed on the external device 45 so that the large antenna 31 faces the large antenna 21 of the external device 45.

The communication control unit 343, when supplying power to the external device 45, transmits the carrier signal by switching the frequency resonance characteristic of the large antenna 31 to the second characteristic allowed to be approximately flat so that power to be generated in the power generation unit 345 is increased.

The external device 45 receives the carrier signal transmitted from the large antenna 31 of the power supply module 30b and generates power from the received carrier signal. The external device 45 also charges the internal battery by using the generated power. Further, the external device 45 performs various operations by using the generated power when there is not provided a battery, or when the battery has been charged.

The power supply module 30b performs communication with the external device 45 by using the small antenna 32, transmitting content data and the like stored in the memory unit 338 to the external device 45. It is also preferable that the power supply module 30b transmits information indicating the remaining amount of the battery and authentication information for identifying whether it is a normal power supply module to the external device 45.

Accordingly, the power supply module 30b can obtain various advantages by performing charging of the internal power supply unit 340 by power generated by communication with the reader/writer 20 through the large antenna. That is, the power supply module has relatively large space inside the module due to the nature thereof (components of a power supply circuit are large, tight integration is difficult because of heat release and so on), therefore, it is possible to save space on the side of the external device by mounting a memory for the external device in vacant space. When the power supply module 30b itself has communication functions, it is possible to secure power necessary for transmitting the carrier for high-speed communication, therefore, the power supply module 30b can transmit data stored in the mounted memory for the external device to the external device. The power supply module 30b can execute all of the near-field wireless communication, power discharge (at the time of driving the external device) and power supply (at the time of charging), therefore, it is not necessary to provide an opening for a connection interface at the module itself. Accordingly, it is possible to provide the power supply module 30b which is dustproofed and waterproofed simply and easily. The power supply module 30a also does not have a mechanical structure or a contact point. Therefore, it is possible to provide the reliable power supply module 30b which is corrosion-free, deterioration-free, trouble-free and the like. It is also possible to transmit information of the battery remaining amount, authentication indicating the normal battery by the non-contact communication.

[Usage Patterns the Power Supply Module]

Furthermore, various usage patterns can be realized by combining the above playback device 30a and the power supply module 30b.

Figure 15:
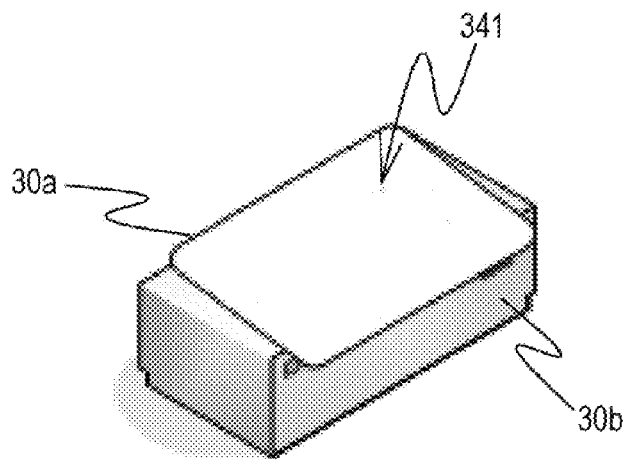
FIG. 15 is a view showing a usage pattern of the power supply module as an example.

FIG. 15 shows a case in which the playback device 30a is placed on the power supply module 30b and performs communication with the power supply module 30b. The playback device 30a is, for example, a display-type (with a touch panel) playback device with passive operation. The playback device 30a performs communication with the power supply module 30b, thereby acquiring information concerning the power supply state (remaining amount) of the power supply included in the power supply module 30b, the contents of the memory and the like, and displaying the information on a display unit with the touch panel 341. When the display unit with the touch panel 341 is operated, the playback device 30a generates a command signal in accordance with the operation and supplies the command to the power supply module 30b to thereby reading data stored in the memory of the power supply module 30b.

When the large antenna 31 and the small antenna 32 are respectively provided at plural surfaces, for example, facing two surfaces of the power supply module 30b, the power supply module 30b not only can supply power and supply content data to the playback device 30a but also can receive power and content data from the reader/writer 20.

Figure 16A:
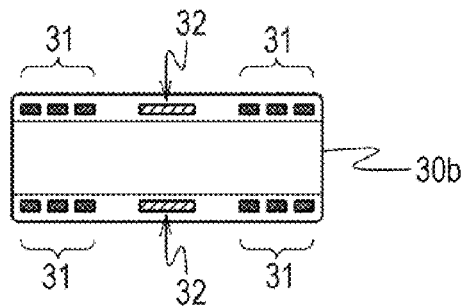
FIG. 16A to FIG. 16D are views showing other usage patterns of the power supply module as examples.

FIG. 16A shows a configuration of the power supply module 30b in a case in which the large antenna 31 and the small antenna 32 are provided at two facing surfaces respectively.

Figure 16B:
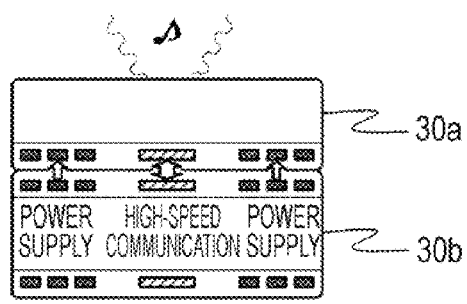

FIG. 16B shows a configuration when the playback device 30a is placed on the power supply module 30b having the antennas at both surfaces. The power supply module 30b performs high-speed communication with the playback device 30a. In this case, the power supply module 30b transmits a carrier signal from the large antenna by using power supplied from the internal battery to thereby operate the playback device 30a. The power supply module 30b performs high-speed communication of content data stored in the internal memory, playing back the transmitted content data in the playback device 30a. Accordingly, the power supply module 30b functions as an external power supply as well as a high-speed storage device of the playback device 30a.

A holding mechanism which holds the playback device 30a and the power supply module 30b in a combined state is provided to allow the large antennas of the playback device 30a and the power supply module 30b to be in the closed contact state. It is possible to carry the playback device 30a and the power supply module 30b in the combined state easily by providing such mechanism.

Figure 16C:
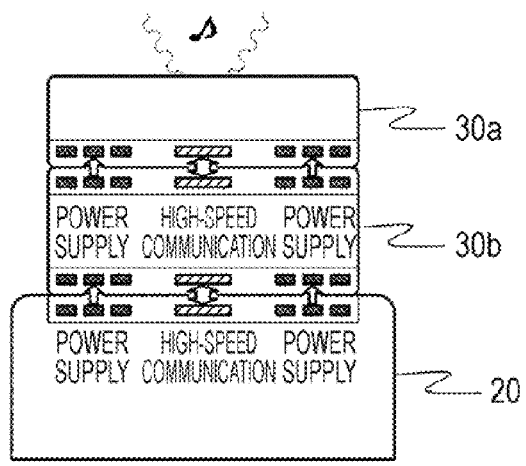

FIG. 16C shows a case in which the power supply module 30b is placed on the reader/writer 20 in a state in which the playback device 30a is placed on the power supply module 30b having the antennas at both surfaces.

In this case, the power supply module 30b charges the internal battery by using power supplied from the reader/writer 20. The power supply module 30b transmits a carrier signal from the large antenna by using power supplied from the internal battery, thereby operation the playback device 30a. It is also preferable that the power supply module 30b transmits a carrier signal from the large antenna by using power supplied from the reader/writer 20.

The power supply module 30b store content data supplied from the reader/writer 20 in the internal memory. The power supply module 30b performs high-speed communication of content data stored in the internal memory to play back transmitted content data in the playback device 30a. It is also possible that the power supply module 30b transmits content data supplied from the reader/writer 20 to the playback device 30a.

According to the above, charging of the power supply module 30b, update of accumulated content data can be performed.

Figure 16D:
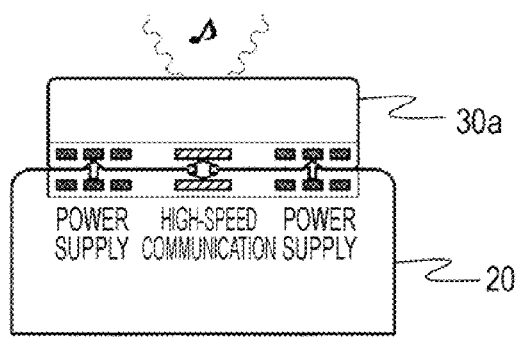

FIG. 16D shows a configuration of a case in which the power supply module 30b is removed. In this case, operation will be the one of the above-described second embodiment. Also in the cases shown in FIG. 16C and FIG. 16D, when there is provided the holding mechanism which holds the reader/writer 20, the playback device 30a and the power supply module 30b in the combined state, it is possible to carry them in the combined state easily.

In the wireless communication device and the power receiving device of the embodiments, it is possible to perform communication and the like by receiving sufficient power even when the near-field wireless communication is performed in a state in which antennas of the transmission-side and the receiving-side wireless communication devices are in the close contact state. Accordingly, the embodiments can be applied to not only the IC card used as individual authentication, electronic money payment and the like but also the playback device which plays back video and audio contents, the power supply module and the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wireless communication device comprising:
   a first communication processing unit for performing communication in an electromagnetic induction system by using a first antenna unit;
   a second communication processing unit for performing communication at a higher speed than the first communication processing unit by a system or a communication frequency different from the electromagnetic induction system by using a second antenna unit; and
   a power generation unit for generating power at least for performing communication operations from a carrier signal received by the first antenna unit, and
   wherein the power generated is increased in the power generation unit by switching a frequency resonance characteristic of the first antenna unit to a non-resonant state by reducing a quality factor when performing communication at the higher speed using the second antenna unit.

2. The wireless communication device according to claim 1, wherein the first communication processing unit enables the quality factor in an antenna resonant circuit of the first antenna unit to be high when data communication is performed as well as enables the quality factor to be lower than the time of performing data communication when data communication is not performed.

3. The wireless communication device according to claim 2,
   wherein the first antenna unit is used in close contact with a transmission-source antenna unit which transmits the carrier signal.

4. The wireless communication device according to claim 1, further comprising
   a content playback unit performing playback of contents, and
   wherein the power generation unit supplies generated power to the content playback unit.

5. The wireless communication device according to claim 3,
   wherein the content playback unit performs playback by using content data received in the second communication processing unit.

6. The wireless communication device according to claim 1, further comprising:
   a power supply unit which can be charged, and
   wherein the power generation unit charges the power supply unit by using generated power to supply power at least for performing communication operations from the power supply unit.

7. The wireless communication device according to claim 5,
   wherein the first and second antenna units used in the plural communication processing units are respectively provided on different surfaces.

8. A power receiving device comprising:
   a power generation unit for generating power from a carrier signal received by an antenna unit for performing data communication in an electromagnetic induction system, and
   wherein the power generated is increased in the power generation unit by switching a frequency resonance characteristic of the antenna unit to a non-resonant state by reducing a quality factor in accordance with a data communication operation in the electromagnetic induction system
   when performing communication at a higher speed using another antenna unit.

9. The wireless communication device according to claim 1, wherein the frequency resonance characteristic of the first antenna unit is different when performing communication using the first antenna unit than when performing high speed communication using the second antenna unit.

10. The wireless communication device according to claim 1, wherein the frequency resonance characteristic of the first antenna unit is set to the non-resonate state when performing communication at the higher speed using the second antenna unit.

* * * * *